United States Patent
Toubiana et al.

(10) Patent No.: US 11,891,955 B2
(45) Date of Patent: Feb. 6, 2024

(54) OPTIMISED HEAT EXCHANGE SYSTEM OF A TURBOMACHINE

(71) Applicant: SAFRAN, Paris (FR)

(72) Inventors: Ephraïm Toubiana, Moissy-Cramayel (FR); Samer Maalouf, Moissy-Cramayel (FR); Etienne Yung Tang, Moissy-Cramayel (FR)

(73) Assignee: SAFRAN, Paris (FR)

( * ) Notice: Subject to any disclaimer, the term of this patent is extended or adjusted under 35 U.S.C. 154(b) by 149 days.

(21) Appl. No.: 17/611,319

(22) PCT Filed: May 11, 2020

(86) PCT No.: PCT/FR2020/050771
§ 371 (c)(1),
(2) Date: Nov. 15, 2021

(87) PCT Pub. No.: WO2020/234525
PCT Pub. Date: Nov. 26, 2020

(65) Prior Publication Data
US 2022/0205390 A1    Jun. 30, 2022

(30) Foreign Application Priority Data
May 20, 2019    (FR) ...................... 1905261

(51) Int. Cl.
*F02C 7/18* (2006.01)
*F28D 7/08* (2006.01)
(Continued)

(52) U.S. Cl.
CPC .............. *F02C 7/18* (2013.01); *F28D 7/085* (2013.01); *F28F 13/08* (2013.01); *F05D 2260/22141* (2013.01); *F28D 2021/0021* (2013.01)

(58) Field of Classification Search
CPC ...... F02C 7/18; F02C 7/14; F02C 7/06; F28D 7/085; F28D 2021/0021; F28D 2021/0049;
(Continued)

(56) References Cited

U.S. PATENT DOCUMENTS

| 4,254,618 A |   | 3/1981 | Elovic |            |
|-------------|---|--------|--------|------------|
| 4,991,394 A | * | 2/1991 | Wright | F02C 7/185 |
|             |   |        |        | 60/39.83   |
| 5,095,973 A | * | 3/1992 | Toy    | F28F 3/02  |
|             |   |        |        | 165/185    |

(Continued)

FOREIGN PATENT DOCUMENTS

| CN | 109210961 A  | 1/2019 |
| EP | 1916399 A2   | 4/2008 |
| WO | 2008025136 A1 | 3/2008 |

OTHER PUBLICATIONS

Written Opinion of the International Searching Authority dated Nov. 17, 2020, issued in corresponding International Application No. PCT/FR2020/050771, filed on May 11, 2020, 6 pages.
(Continued)

*Primary Examiner* — Hoang M Nguyen
(74) *Attorney, Agent, or Firm* — Christensen O'Connor Johnson Kindness PLLC

(57) ABSTRACT

A heat exchange system of a turbomachine, includes a heat exchanger including a support wall, a plurality of fins each extending in a radial direction from a radially outer surface of the support wall, and a cover covering the fins, wherein the cover is connected, upstream in the direction of flow of the air flow, to a first profiled wall, and downstream to a second profiled wall, the first profiled wall being arranged upstream from the fins and configured to guide and slow down the flow of air entering the heat exchanger through the fins, and the second profiled wall being arranged down-
(Continued)

stream from the fins and configured so as to accelerate the flow of air leaving the heat exchanger, wherein the cover has an at least partially curvilinear aerodynamic profile and an outer peripheral surface having surface continuity with radially outer surfaces of the first and second walls.

21 Claims, 6 Drawing Sheets

(51) Int. Cl.
*F28F 13/08* (2006.01)
*F28D 21/00* (2006.01)
(58) Field of Classification Search
CPC ............ F28D 7/06; F28D 7/005; F28F 13/08; F28F 1/24; F05D 2260/22141; F05D 2260/4031; F05D 2260/40311; F05D 2260/98; Y02T 50/60; F02K 3/06
See application file for complete search history.

(56) References Cited

U.S. PATENT DOCUMENTS 11,655,761 B2 * 5/2023 Toubiana ................ F28D 7/085
60/226.1

OTHER PUBLICATIONS

International Preliminary Report on Patentability dated Nov. 16, 2021, issued in corresponding International Application No. PCT/FR2020/050771, filed on May 11, 2020, 1 page.
International Search Report dated Nov. 17, 2020, issued in corresponding International Application No. PCT/FR2020/050771, filed on May 11, 2020, and its English translation thereof, 2 pages.
Written Opinion of the International Searching Authority dated Nov. 17, 2020, issued in corresponding International Application No. PCT/FR2020/050771, filed on May 11, 2020, and its English translation thereof, 3 pages.

* cited by examiner

OPTIMISED HEAT EXCHANGE SYSTEM OF A TURBOMACHINE

CROSS-REFERENCES TO RELATED APPLICATIONS

This application is a National Stage of International Application No. PCT/FR2020/050771, filed May 11, 2020, which claims priority to French Patent Application No. 1905261, filed May 20, 2019, the entire disclosures of which are hereby incorporated by reference.

TECHNICAL FIELD OF THE INVENTION

The present invention relates to the general field of aeronautic. It aims in particular at a heat exchange system for a turbomachine.

BACKGROUND

A turbomachine, in particular of an aircraft, comprises various members and/or equipment that need to be lubricated and/or cooled, such as rolling bearings and gears. The heat released by these components, which can be very high depending on the power of the member and/or the equipment, is transported by a fluid and evacuated towards cold sources available in the aircraft.

It is known to equip the turbomachine with one or more heat exchange systems to carry out the heat exchange between the fluid (typically oil) and the cold source (air, fuel, etc.). There are even different types of heat exchange systems, such as for example the fuel/oil heat exchangers, generally known by the acronym FCOC (Fuel Cooled Oil Cooler) and the air/oil heat exchangers, known by the acronym ACOC (Air-Cooled Oil Cooler). Examples of heat exchanger systems are known from the documents EP-A2-1916399, CN-A-109210961, WO-A1-2008/025136, and U.S. Pat. No. 4,254,618.

The FCOC heat exchangers have a dual function of heating the fuel before the combustion in the combustion chamber of the turbomachine and cooling the oil heated by the heat dissipations of the turbomachine. However, the FCOC heat exchangers are not sufficient to absorb all the heat dissipations because the temperature of the fuel is limited for safety reasons.

The additional cooling is obtained by the ACOC heat exchangers, in particular those of the surface type known by the acronym SACOC. The surface heat exchangers are usually located in the secondary vein of the turbomachine and use the secondary air flow to cool the oil circulating in the turbomachine. These heat exchangers are in the form of a metallic surface piece allowing the passage of oil in machined channels. The secondary air flow is guided along fins carried by this surface piece and which have the role of increasing the contact surface with the secondary air flow and extracting the calories. However, the disadvantage of the SACOC heat exchangers is that they create additional pressure drops in the relevant secondary vein, since they disturb the air flow, which has an impact on the performance of the turbomachine as well as on the specific fuel consumption.

Their aerothermal performance (ratio between the thermal power dissipated and the pressure drop induced on the side of the secondary air flow) is low.

In addition, the cooling requirements of the lubricating fluid are increasing due to the higher rotation speeds and the power requirements to meet the specification trends on the turbomachines.

SUMMARY OF THE INVENTION

The objective of the present invention is to provide a heat exchange system allowing to optimize the efficiency of the heat exchanges by controlling the flow rate of the air flow passing through the system, while avoiding the pressure drops and disturbing as little as possible the air flow, in particular the secondary air flow of a turbomachine with which it cooperates.

This is achieved in accordance with the invention by a turbomachine heat exchange system comprising a heat exchanger comprising a support wall, a plurality of fins each extending in a radial direction from a radially outer surface of the support wall and intended to be swept by an air flow, and a cover covering the fins, the cover being connected upstream, in the direction of flow of the air flow, to a first profiled wall and downstream to a second profiled wall, the first profiled wall being arranged upstream from the fins and configured so as to guide and slow down the air flow entering the heat exchanger through the fins, and the second profiled wall being arranged downstream of the fins and configured so as to accelerate the air flow exiting the heat exchanger, the cover having an at least partly curvilinear aerodynamic profile and an outer peripheral surface having surface continuity with radially outer surfaces of the first and second walls.

Thus, this solution allows to achieve the above-mentioned objective. In particular, by modifying the flow conditions in the heat exchanger, a heat dissipation with an optimal aerothermal performance is ensured, which contributes to the reduction of the pressure drops. In fact, when this heat exchange system is installed in a turbomachine and in particular in a secondary vein, the flow of the secondary air flow is very turbulent, which corresponds to a high flow Reynolds number that degrades the aerothermal performance of the heat exchanger. The flow reaches Mach values of about 0.6 at take-off and cruise. By slowing down the flow velocity of the air flow at the inlet of this heat exchanger (without modifying its intrinsic configuration) and by increasing the velocity at the outlet, it allows to optimize its aerothermal performance and thus minimize the pressure drops for a given heat dissipation. Furthermore, the first and second profiled walls allow to better control and improve the aerodynamics of the part of the air flow that bypasses the exchanger of the fins, i.e. that does not pass through the fins. The cover with its aerodynamic profile allows the heat exchanger to be better integrated into the air flow, in particular the secondary air flow.

The heat exchange system also comprises one or more of the following characteristics, taken alone or in combination:
- each first and second profiled walls is attached to the support wall via support elements extending radially from the radially outer surface.
- the first profiled wall comprises a first wall portion forming, with the support wall, an air inlet having a first radial height, and the second profiled wall comprises a first wall portion forming, with the support wall, an air outlet having a second radial height, the ratio between the first height and the second height being equal to or greater than 0.5.
- the cover comprises a first wall portion defined in an inclined plane forming a predetermined angle with a plane in which the radially outer surface of the support wall is defined.
- the cover has a second wall portion which is curvilinear and arranged upstream of the first portion.

the heat exchanger comprises a profiled panel covering the fins, which is substantially flat or curved and extends radially between the fins and the cover.

the profiled panel extends to a maximum radial distance from the radially outer surface which is greater than the first height and the second height respectively of the first and second profiled walls.

the exchange system comprises a fluid circulation circuit in which a fluid intended to cool and/or lubricate members and/or equipment of the turbomachine circulates, the circuit comprising a first duct arranged in the support wall and a second duct arranged in the profiled panel.

the fluid circulation circuit comprises two channels connecting the first and second ducts to each other.

the second curvilinear wall portion has a radius of curvature.

the radius of curvature is a function of the length of the profiled panel in a longitudinal direction perpendicular to the radial direction, the ratio between the length of the profiled panel and the radius of curvature being between 0.5 and 1.5 mm.

the fins are continuous and rectilinear each along a longitudinal direction or are discontinuous and arranged in staggered or are corrugated.

at least one fin has different heights in the radial direction and varies so as to conform the profile of the cover.

the fins comprise a first type of fins and a second type of fins arranged on the radially outer surface along a transverse direction perpendicular to the radial direction, the fins of the first type of fins each extending radially between the support wall and the cover, and each being attached to the cover so as to bear the cover over their full radial heights.

the fins are arranged transversely so that every third fin is a fin of the first type.

the fins of the first type have a central portion with a radial height less than or equal to the height of the cover.

the heat exchanger is made by additive manufacturing.

the panel and the first and second profiled walls are made in one piece.

the cover and the panel are made in one piece.

the fins are attached to the panel.

the fins are made in one piece with the panel.

the heat exchange system is intended to be arranged in a secondary vein of the turbomachine.

the heat exchanger is of the air/fluid type and preferably a surface heat exchanger.

the fluid is a lubricating oil.

the support elements are arranged and evenly distributed in a transverse direction perpendicular to the longitudinal direction.

The invention also relates to a turbomachine module with a longitudinal axis X comprising an annular casing around the longitudinal axis in which an air flow circulates and a heat exchange system having any of the preceding characteristics which is arranged in the annular casing, the annular casing comprising an annular wall which guides at least partly the air flow and which has an opening or a recess in which the heat exchanger with the profiled panel or the cover is installed, the first wall being connected upstream of the profiled panel or the cover to a portion of the annular wall and the second wall being connected downstream of the profiled panel or the cover to a portion of the annular wall.

The heat exchanger is buried in the wall of the annular casing.

The invention further relates to a turbomachine comprising at least one heat exchange system having any of the foregoing characteristics and/or a turbomachine module as aforesaid.

BRIEF DESCRIPTION OF FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
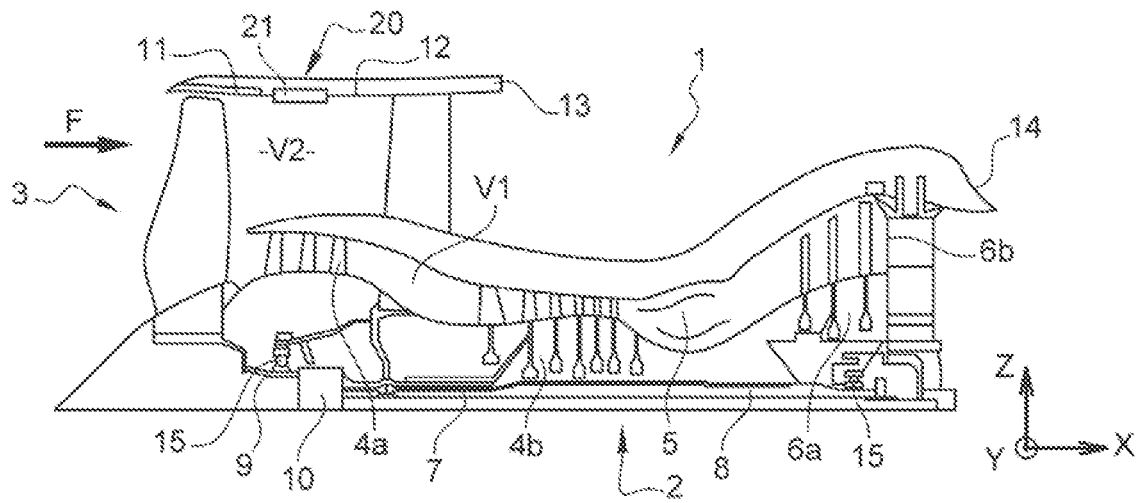
FIG. 1 is an axial cross-sectional view of an example of a turbomachine to which the invention applies.

FIG. 1 shows an axial cross-sectional view of a turbomachine of longitudinal axis X to which the invention applies. The turbomachine shown is a double-flow turbomachine 1 intended to be mounted on an aircraft. Of course, the invention is not limited to this type of turbomachine.

This double-flow turbomachine 1 generally comprises a gas generator 2 upstream of which is mounted a fan or fan module 3.

In the present invention, the terms "upstream" and "downstream" are defined in relation to the flow of gases in the turbomachine and here along the longitudinal axis X.

The gas generator 2 comprises a gas compressor assembly (here comprising a low pressure compressor 4a and a high pressure compressor 4b), a combustion chamber 5 and a turbine assembly (here comprising a high pressure turbine 6a and a low pressure turbine 6b). Typically the turbomachine comprises a low pressure shaft 7 which connects the low pressure compressor and the low pressure turbine to form a low pressure body and a high pressure shaft 8 which connects the high pressure compressor and the high pressure turbine to form a high pressure body. The low-pressure shaft 7, centered on the longitudinal axis, drives here a fan shaft 9 by means of a gearbox 10. Rotational guide bearings 15 are also allows to guide the low pressure shaft 7 in rotation with respect to a stationary structure of the turbomachine.

The fan 3 is shrouded by a fan casing 11 carried by a nacelle 12 and generates a primary air flow which circulates through the gas generator 2 in a primary vein V1 and a secondary air flow which circulates in a secondary vein V2 around the gas generator 2. The secondary air flow is ejected by a secondary nozzle 13 terminating the nacelle while the primary air flow is ejected outside the turbomachine via an ejection nozzle 14 located downstream of the gas generator 2. In the following, the fan casing and the nacelle are considered as one piece.

The guide bearings 15 and the speed reducer 10 in this example of configuration of the turbomachine must be lubricated and/or cooled to ensure the performance of the turbomachine. The power generated by these is dissipated in a fluid from a fluid supply source installed in the turbomachine, which allows to lubricate and/or cool various members and/or equipment of the turbomachine. Of course, other equipment of the turbomachine generates a lot of heat that must be extracted from its environment.

To this end, the turbomachine comprises a heat exchange system 20 which allows to cool the fluid intended to lubricate and/or cool these members and/or equipment. In the present example, the fluid is an oil and the cold source intended to cool the oil is the air flow circulating in the turbomachine, in particular the secondary air flow.

The heat exchange system comprises a heat exchanger 21 which is arranged in the fan casing of the turbomachine as schematically shown in FIG. 1. The heat exchanger is of the air/oil surface type.

Figure 2:
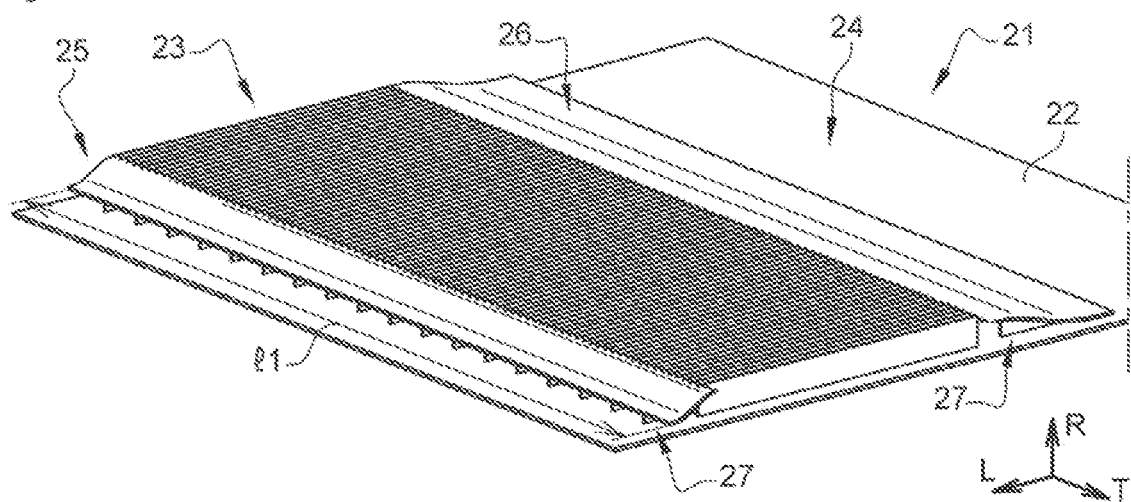
FIG. 2 is a perspective and partial view of a heat exchange system intended to equip a turbomachine according to the invention.

With reference to FIG. 2, the heat exchanger 21 comprises a support wall 22 which extends along a longitudinal direction L. The support wall extends here substantially flat. This wall may not be completely flat but curved to follow the profile of the wall of the fan casing which is intended to carry the heat exchanger and which is substantially cylindrical (of longitudinal axis X). The heat exchanger may occupy the entire wall of the fan casing or be arranged on a portion thereof.

The heat exchanger 21 also comprises a plurality of fins 23, each of which rises here from a radially outer surface 24 of the support wall 22 along a radial direction R. We use the term "direction" to describe the heat exchanger in particular. These fins are intended to be swept by the secondary air flow entering the fan casing 11.

As can be seen in FIG. 2, the fins 23 are straight and each extend in the longitudinal direction L (parallel to the circulation or flow of the air flow in the turbomachine and in particular in the heat exchanger). The longitudinal direction is parallel to the longitudinal axis in the installation situation. More precisely, each fin is flat. The fins are arranged successively and regularly on the radially outer surface along a transverse direction T which is perpendicular to the longitudinal direction L. They are still substantially parallel to one another. Each fin has a leading edge BA and a trailing edge BF which are opposite to each other in the direction of the air flow (see FIG. 3). Alternatively, the fins may be discontinuous and arranged in staggered and/or corrugated in the radial or longitudinal direction.

Figure 3:
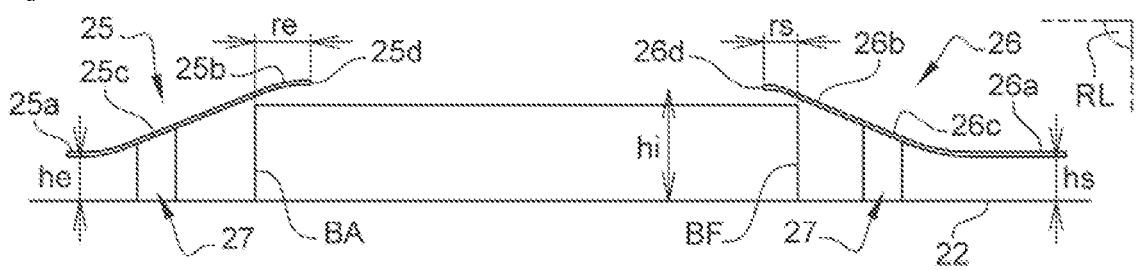
FIG. 3 is a schematic view in axial section of an example of a heat exchange system according to the invention.

In FIGS. 2 and 3, the heat exchanger 21 comprises a first profiled wall 25 arranged upstream of the fins (along the direction of the air flow along the radially outer surface) and which is configured to direct and guide the flow entering the heat exchanger. This first wall 25 is also configured to slow the air flow entering the heat exchanger. It has a divergent profile. The first wall 25 extends over a distance I1 at least equal to the distance over which the fins are arranged. In particular, the width I1 of the first profiled wall 25 is greater than the width over which the fins are arranged (in the transverse direction T).

The heat exchanger 21 is also provided with a second profiled wall 26 arranged downstream of the fins so as to reduce the recirculation phenomena which occur downstream of the fins. The second profiled wall is also configured to accelerate the flow at the outlet of the heat exchanger.

In particular, in FIG. 3, each first and second profiled walls 25, 26 has a substantially corrugated or curved shape in a plane RL (formed by the perpendicular longitudinal L and radial R directions) perpendicular to the plane LT of the support wall 22. More specifically, the first wall 25 comprises a first wall portion 25a, upstream, forming with the support wall 22 an air inlet that has a first predetermined height he along the radial direction. The first height he is less than the radial height hi of the fins. The first wall 25 comprises a second wall portion 25b (downstream of the first wall portion 25a), which covers at least a part of the fins (along the longitudinal direction L). The wall portion 25b extends over an overlap distance re so as to better control and improve the aerodynamics of the air flow passing radially above (outside) the fins 23 according to FIG. 3. This second wall portion 25 covers the leading edges BA of all the fins 23 aligned along the transverse direction T.

The second wall 26 has substantially the same configuration as that of the first wall 25. However, it has a convergent profile. Its width I1 is identical to that of the first wall 25. The second wall 26 also comprises a downstream wall portion 26a forming an air outlet with the support wall 22, which has a second predetermined height hs along the radial direction. The second height hs is less than the height hi of the fins.

In the present embodiment, the ratio between the first height he and the second height hs is between 0.5 and 1.

Similarly, the second wall 26 comprises a second wall portion 26b that covers at least a part of the fins 23 (along the longitudinal direction L). The second wall portion 26b extends over an overlap distance rs for the same purpose of controlling and improving the aerodynamics of the air flow passing over the heat exchanger. This second wall portion 25 covers the trailing edges BF of all the fins 23 aligned along the transverse direction T.

With reference to FIG. 3, the heat exchanger 21 comprises a plurality of support elements 27 allowing to attach the fins to the support wall 22. In other words, the support elements 27 extend in the radial direction from the radially outer surface 24 of the support wall 22. The support elements 27 are evenly distributed along the first and second walls 25, 26 respectively. These ensure a better mechanical strength of the first and second walls.

According to an alternative embodiment, the support elements 27 are configured to straighten the air flow entering the heat exchanger through the first profiled wall. Each support element 27 is in the present example attached to a central wall portion 25c, 26c respectively of the first and second walls. The central wall portions 25c, 26c each have an inclination with respect to the longitudinal direction. For this purpose, each support element 27 has a trapezoidal shape here.

The support elements 27 arranged at the inlet of the heat exchanger are potentially thicker than the fins 23 for a better mechanical strength of the first wall 25 on the support wall 22. Indeed, the applied forces are potentially more important locally, because of the gyration of the flow of the air flow upstream and its straightening by these same support elements. In addition, these thicker support elements 27 are spaced further apart along the transverse direction to reduce the associated pressure drops in this area where the heat exchanges are not optimal (higher flow velocity).

Alternatively, the support elements 27 and the fins 23 have the same thickness.

Figure 4:
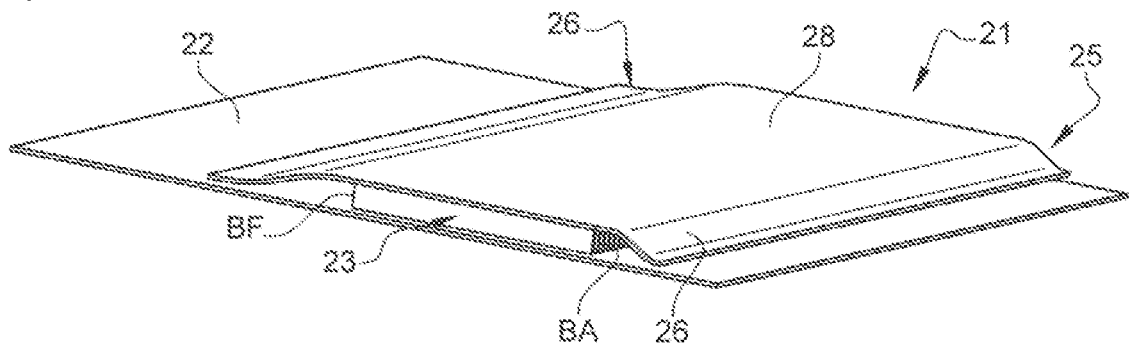
FIG. 4 is a perspective view of an embodiment of a heat exchange system according to the invention.
Figure 5:
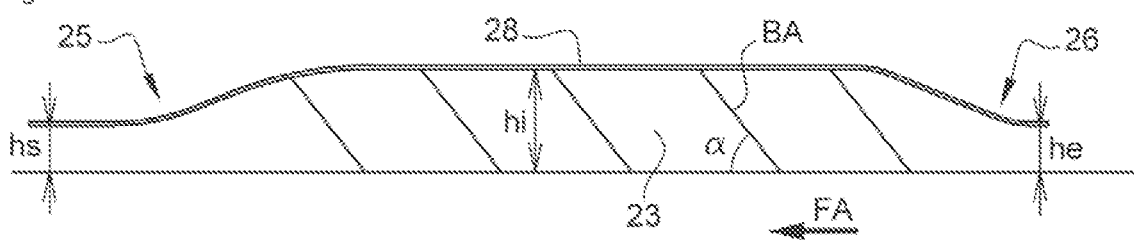
FIG. 5 illustrates schematically and in axial cross-section a variant of the heat exchange system shown in FIG. 4.

FIGS. 4 and 5 show another embodiment of the invention. The same elements of the previous embodiment are represented by the same numerical references. As illustrated, the heat exchanger 21 comprises a profiled panel 28 covering the fins 23 so as to control the flow of the air flow within the heat exchanger without risk of bypassing the air flow through the heat exchanger. The fins 23 are thus arranged radially between the support wall 22 and the profiled panel 28. The air flow entering the secondary vein V2 is separated into an air flow part F1 that bypasses the heat exchanger and an air flow part F2 that flows through the fins.

Figure 6:
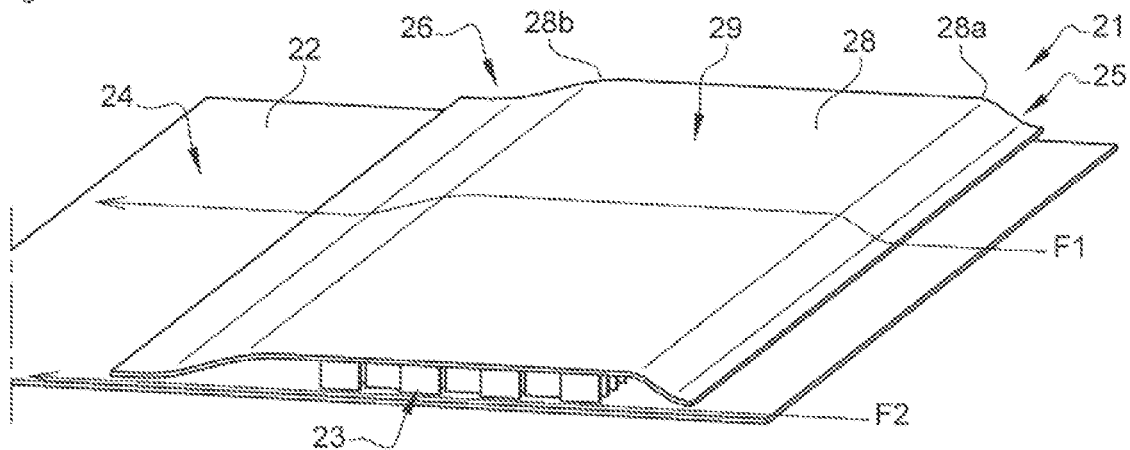
FIG. 6 is a perspective view of another embodiment of the heat exchange system according to FIG. 4.

In this example of embodiment, the panel 28 extends along the longitudinal direction L between the first wall 25 and the second wall 26 and also has a width identical to that of the first and second walls 25, 26. The panel 28 is substantially circular or curved (around the longitudinal axis X in the situation of installation in the turbomachine). In particular, the panel comprises a first longitudinal edge 28a that joins a first longitudinal end 25d of the first profiled wall and a second longitudinal edge 28b that joins a first end 26d of the second wall 26 (FIG. 6). As illustrated in FIG. 5, the outer peripheral surface 29 of the panel 28 has a surface continuity with the radially outer surfaces 42, 43 of the first and second walls 25, 26.

The walls 25, 26 and the panel 28 are advantageously made in one piece and for example by an additive manufacturing method (or 3D printing) such as a laser fusion method on powder bed.

The panel 28 extends at a radial distance equal to or greater than that of the fins 23. In other words, this radial distance is greater than the first and second height he, hs of the first and second walls 25, 26. Advantageously, but not restrictively, the fins are attached, for example by brazing, to the panel 28 and/or to the support wall 22. Alternatively, the fins 23 and the support wall 22 are formed in one piece (i.e. from one material and in one piece) and advantageously by additive manufacturing. Similarly, the fins and the panel 28 can be made in one piece. The additive manufacturing is carried out in a direction FA shown in FIG. 5 from upstream to downstream of the heat exchanger. In this case, to facilitate the additive manufacturing and in particular without support, the leading edge BA of the fins 23 has an angle alpha (α) with the radial direction.

Of course, the heat exchanger as a whole can be manufactured by another manufacturing method such as the forging.

Moreover, the fact of arranging the panel 28 on the fins allows to improve the mechanical strength of the heat exchanger and thus to reduce the thickness of the fins 23. However, a thickness reduction of the fins 23 also allows to reduce the mass of the heat exchanger 21. Similarly, in the case of support elements 27 which are thicker than the fins, and which are arranged with larger gaps between them along the transverse direction T, these may serve as a support for the panel 28 in flow outlet area of the air flow.

According to an alternative of the previous embodiment and illustrated in FIG. 6, the heat exchanger 21 has a plurality of fins 23 which are arranged in a staggered manner on the radially outer surface 24 of the support wall 23 and along the direction of flow of the air flow F. There are rows of fins 23 in the direction of the longitudinal direction and in the direction of the transverse direction T. As in the previous embodiment, the fins are covered by a central profiled panel 28 which is extended upstream by the first wall 25 and downstream by the second wall 26. The fins arranged in this way allow to intensify by interruption and redevelopment of the thermal boundary layers, which allows to significantly reduce the exchange surface for a given dissipated power or to increase the power that can be dissipated in a given cluttering.

Figure 7:
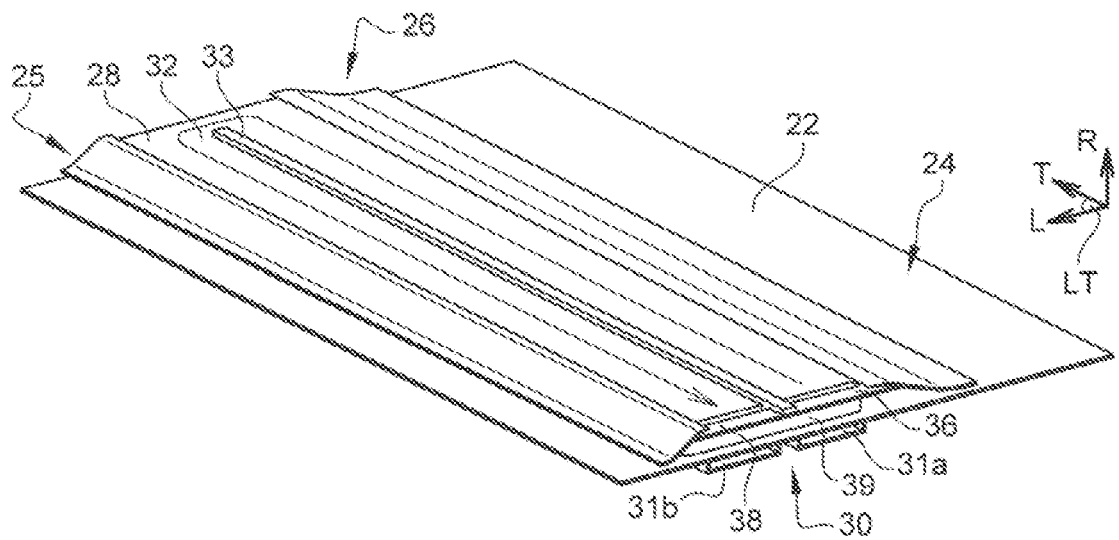
FIG. 7 represents an example of heat exchange system with a fluid duct arranged in one of the walls covering the fins according to the invention.
Figure 8:
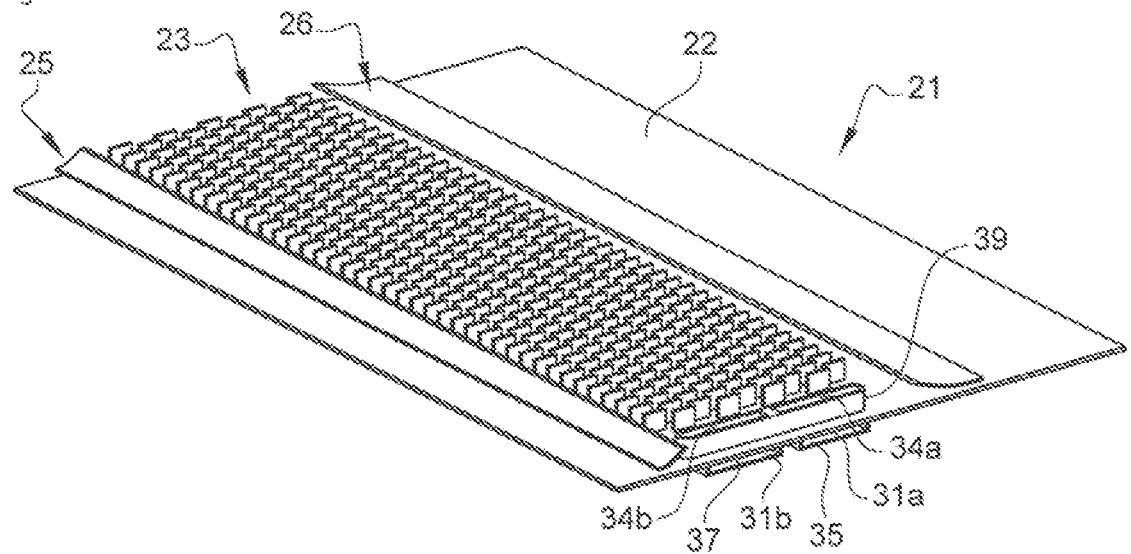
FIG. 8 illustrates according to a perspective and skinned view an example of fin arrangement of a heat exchanger of a heat exchange system cooperating with a fluid circulation circuit according to the invention.
Figure 9:
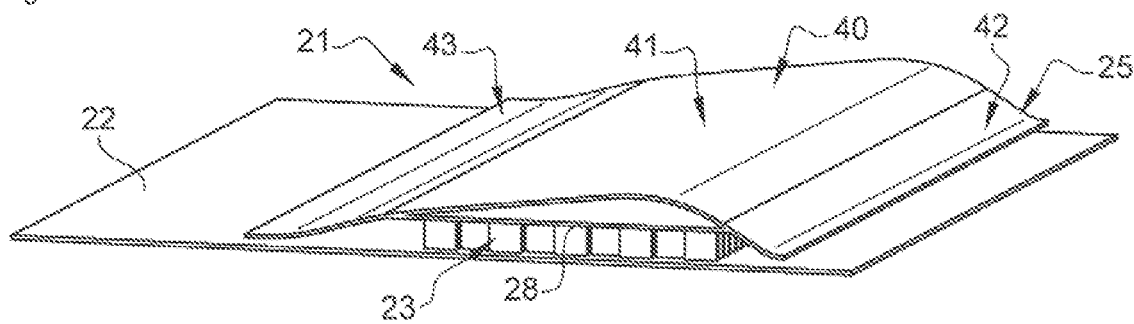
FIG. 9 shows in perspective another embodiment of a heat exchange system with a cover according to the invention.

According to another embodiment represented in FIGS. 7 to 9, the heat exchange system comprises a fluid circulation circuit in which circulates a fluid intended to cool and/or lubricate members and/or equipment of the turbomachine. Typically, the fluidic circulation circuit, using oil, is connected on the one hand to a supply source such as a reservoir and on the other hand to one or more pumps designed to promote the delivery of the oil to the members and/or equipment.

In the present example, the fluid circulation circuit comprises a first duct 30 which is arranged in the support wall 22 and on the side of a radially inner surface thereof. This radially inner surface is radially opposite the radially outer surface 24. The first duct 30 has an oil inlet and an oil outlet (not shown). Furthermore, the first duct 30 is in the form of a first pipeline 31a and a second pipeline 31b each extending in the transverse direction and parallel to each other. The first pipeline 31a comprises the oil inlet while the second pipeline 31b comprises the oil outlet, the inlet and the outlet being placed next to each other.

The fluid circulation circuit also comprises a second duct 32 which is arranged in the wall of the profiled panel 28. In other words, oil circulates on both sides of the fins along the radial direction, which allows to increase the convective exchanges and therefore the power dissipated from the hot fluid (here oil) to the cold source (the air flow in the secondary vein). Advantageously, the second duct 32 is hollowed or formed in the material. As can be seen in FIG. 7, the panel comprises a double wall which we refer to as first partition and second partition and which are radially spaced apart from each other to then form the second duct 32. The latter has a cross-section shaped like a U (in the plane LT) which occupies substantially the entire area of the panel 28. A strand 33 extending along the transversal direction rises radially into the duct 32 to form the two branches of the U. The strand 33 has a width less than that of the panel 28 itself (along the transverse direction T).

In FIG. 8, the fluid circulation circuit further comprises two channels 34a, 34b which connect the first duct 30 and the second duct 32 to each other. The channels 34a, 34b are arranged radially between the wall of the support 22 and the panel 28. A first channel 34a opens on either side (at the level of an end 35) into the first pipeline 31a and (at the level of a first apex 36 of the branch of the U) into the second duct. As for the second channel 31b, it also opens on both sides (at the level of an end 37) into the second pipeline 31b and (at the level of a second apex 38 of the branch of the U) into the second duct.

The channels 34a, 34b are advantageously formed in a partition 39 which connects the panel 28 to the support wall 22. In this way, the "hot" oil enters through the inlet of the first pipeline 31a, into the second duct 32 via the first channel 34a, circulates around the second duct, then through the second channel 34b to circulate in the second pipeline 31b and finally exits through the oil outlet as a "cold" oil. The performance of the heat exchanger is thus improved because the temperature of the fins will increase and be more uniform on their surfaces, thus favoring the propagation of the heat by conduction.

Alternatively, each first duct 30 and second duct 32 may be independently connected to the supply source. In this case, we understand that each of the first and second ducts 30, 32 comprises an oil inlet and outlet respectively. The heat exchanger has no channels 34a, 34b.

The fins 23 which are shown in this embodiment (FIG. 8) are discontinuous (staggered pitch) i.e. there are several fins in a row of fins substantially parallel to the longitudinal direction. Advantageously, the fins are arranged in a staggered. According another alternative, the fins 23 are corrugated along the longitudinal direction or along the radial direction.

Figure 10:
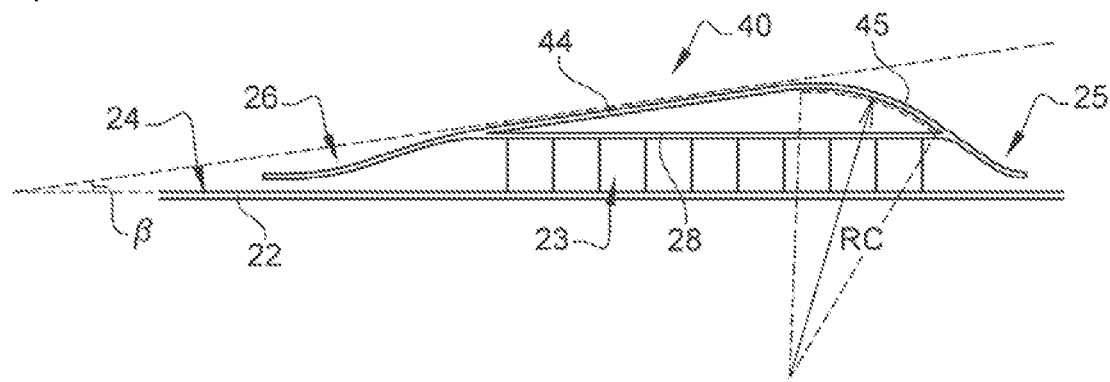
FIG. 10 is an axial cross-sectional view of the embodiment according to FIG. 9.

According to another embodiment illustrated in FIGS. 9 and 10, the heat exchanger is equipped with a cover 40 with an aerodynamic profile which is arranged radially outside the panel 28. Identical elements of the preceding embodiments are represented by the same numerical references. In other words, the panel 28 is located along the radial direction between the fins 23 and the cover 40. Such a configuration allows further to improve the aerodynamics of the heat exchanger and does not disturb the air flow by the integration of the heat exchanger. As can be seen in particular in FIG. 9, the cover 40 has an outer peripheral surface 41 having a surface continuity with radially outer surfaces 42, 43 of the first and second profiled walls 25, 26.

In particular, the cover 40 has a first portion 44 and a second portion 45 which is arranged upstream of the first portion 44 along the direction of the flow of the air flow in the heat exchanger. The first portion 44 is defined in a plane having an inclination with respect to the longitudinal direction L. The inclined plane forms a predetermined angle beta (β) (see FIG. 10) with a plane (parallel to the plane LT) in which the radially outer surface 24 of the support wall 22 is defined. As for the second portion 45, it has a curvilinear shape in the plane RL. The curvilinear portion is here concave. This one is about a quarter circle. Its radius of curvature depends on the length of the panel 28 (along the longitudinal direction L). The ratio between the length and the radius of curvature is between 0.5 and 1.5 mm. The width of the cover 40 is approximately the same as that of the profiled panel. The cover with its aerodynamic profile allows the heat exchanger to be better integrated into the air flow, in particular the secondary air flow, without disturbing it, while the panel 28 here internal improves the aerothermal performance of the flow of the air flow inside the heat exchanger. Each cover 40 and panel 28 is optimised for a part of the air flow.

The panel 28 and the cover 40 may be made in one piece (monobloc) so as to simplify the manufacture and the assembly of the heat exchanger. The additive manufacturing is a manufacturing method that allow to achieve this goal. It may be provided that the fins 23 are also manufactured in one piece with the panel and the cover and following the same manufacturing method.

Figure 11:
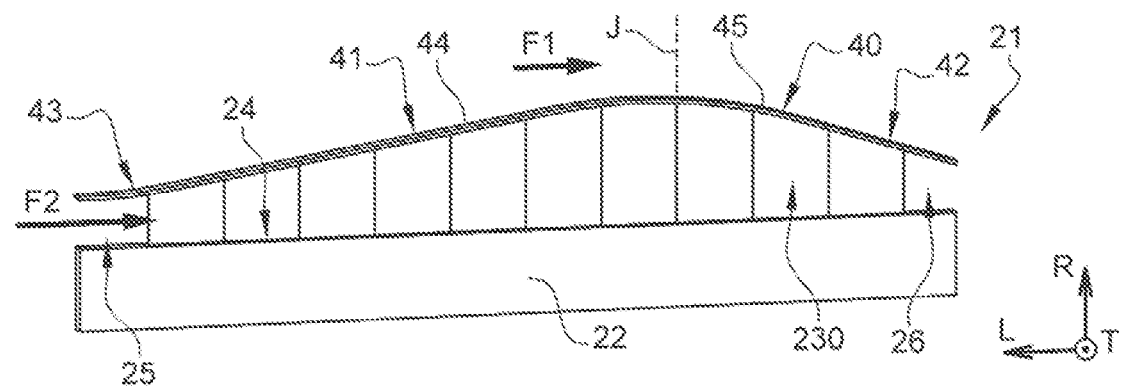
FIG. 11 is a schematic side view of another embodiment of a heat exchange system with a heat exchanger the fins of which have different heights.

FIG. 11 illustrates yet another embodiment of a heat exchange system with a heat exchanger 21 comprising fins 230 which have different heights. In particular, the fins extend from the radially outer surface 24 of the support wall 22 and are covered by a cover 40 having an aerodynamic profile to improve the aerodynamics of the air flow which bypass the heat exchanger. The cover 40 comprises upstream a first wall 25 with a divergent profile and a second wall 26 with a convergent profile. As in the previous cases, the air flow F2 is slowed down when entering the air flow and is accelerated when exiting the heat exchanger 21. The outer peripheral surface 41 has a surface continuity with radially outer surfaces 42, 43 of the first and second walls 25, 26. In the present example, the fins 230 conform to the shape of the cover 40 which covers them. In fact, the cover 40 comprises a first inclined portion 44 and a second curvilinear portion 45. In this way, the fins 230 respectively have a height that varies in an increasing and then decreasing manner from the upstream (of the first wall 25) to the downstream (of the second wall 26) depending on the flow direction of the flow in the heat exchanger. The height of the fins increases up to the longitudinal junction J between the first inclined portion 44 and the second curvilinear portion 45. The height decreases from the junction J. Therefore, there is no panel 28 radially between the fins and the cover.

The fins shown in FIG. 11 are discontinuous and arranged in a staggered manner, but they could each extend along the profile of the cover along the longitudinal direction and have the radial height varying to conform the cover. The fins shown, located at the J-junction, have a radially outer curved (concave) or substantially shaped like an inverted V end. The fins could also be corrugated along the longitudinal direction and along the radial direction.

Figure 12:
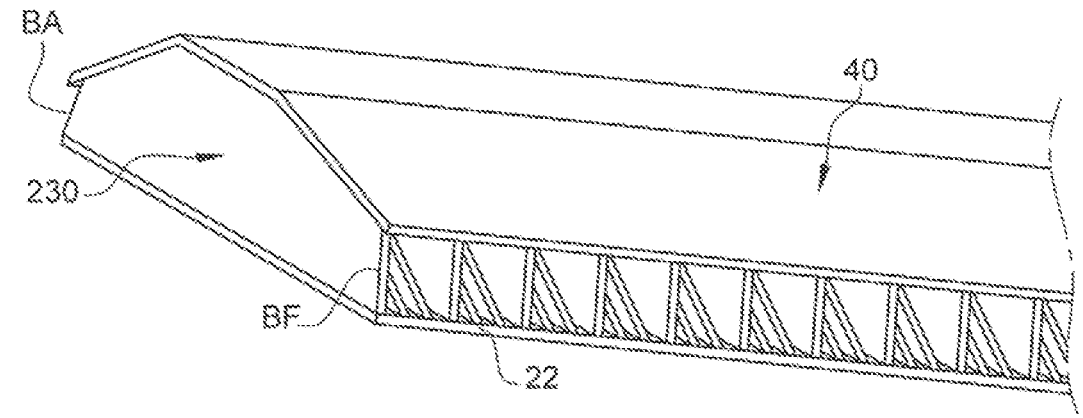
FIG. 12 shows in perspective and partially another embodiment of a heat exchanger of an exchange system, the heat exchanger comprising a cover covering fins according to the invention.
Figure 13:
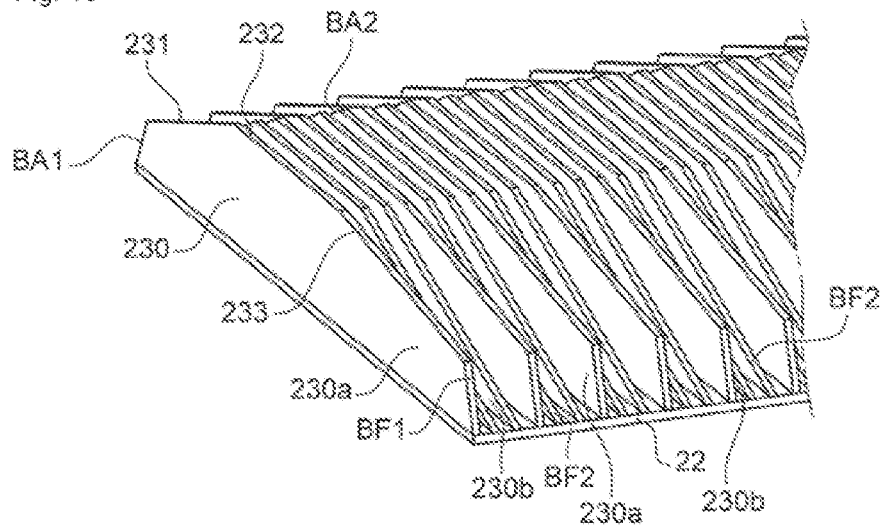
FIG. 13 is a perspective view of the heat exchanger of FIG. 12 without its cover according to the invention.

According to another embodiment schematically illustrated in FIGS. 12 and 13, the heat exchanger comprises fins 230 which extend radially from the support wall 22 and which are covered by a cover 40. The cover comprises a first upstream wall portion and a second downstream wall portion. The fins 230, as in the embodiment shown in FIG. 11, follow the profile of the cover 40 with an increasing and then decreasing height from upstream to downstream. In particular, with reference to FIG. 13, the fins 230 are continuous and straight along the longitudinal direction. We also see that there are two types of fin shapes in this embodiment, a first type of fins supporting the cover and a second type of fins that does not support the cover.

The first type of fins 230a comprises a leading edge BA1 and a trailing edge BF1 that extend to the cover. The leading and trailing edges BA1, BF1 have a radially inner end integral with the support wall 22 and a radially outer end integral with the cover. These leading edges BA1 and BF1 are connected by a first surface 231, a second surface 232 and a third surface 233. These surfaces are radially opposite the radially outer surface 24 of the support wall 22. The first surface 213 and the third surface 233 are inclined to a plane parallel to the plane LT and the second surface extends in a plane substantially parallel to the plane LT.

The second type of fins 230b comprises a leading edge BA2 and a trailing edge BF2 whose respective heights measured between the radially inner end and the radially outer end are less than the height of the leading and trailing edges of the first type of fins 230a. The leading and trailing edges BA2, BF2 are inclined respectively and grow from the support wall 22 to a height corresponding to that of the second surface 232 of the first type of fins.

Each fin has a central portion with a second surface 232 at the same radial height. We understand that all the fins (or at least the fins of the first type 230a) are connected to the cover at the level of their central portion.

In this embodiment, the fins are arranged along the transverse direction so that there is a first type of fins on three fins. In other words, two fins of the second type are arranged adjacent to and between two fins of the first type. Of course, the arrangement can be different, for example so that every fifth fin is a fin of the first type.

The first and second types of fins allow a heat transfer.

FIGS. 14 to 17 show embodiments of a heat exchanger buried in an annular wall here of a secondary vein V2 of the turbomachine and guiding at least partly the secondary air flow. The heat exchanger 21 in its arrangement is swept and/or traversed by the secondary air flow of the turbomachine. The secondary vein is delimited by a radially inner annular wall 50 and a radially outer annular wall 51. The latter is carried at least partly by the fan casing 11.

Figure 14:
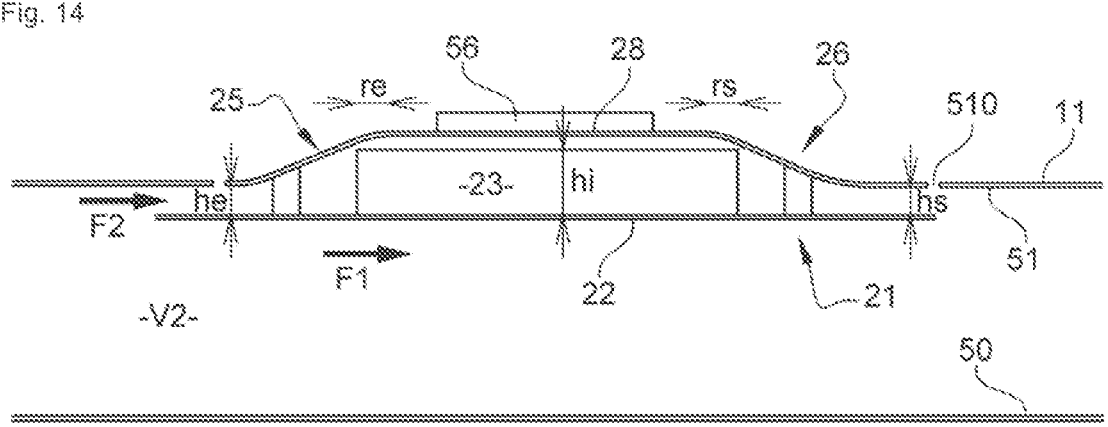
FIG. 14 is a schematic view in axial section of another embodiment wherein a heat exchanger is buried in a wall of the turbomachine according to the invention.

According to an embodiment in FIG. 14, the radially outer annular wall 51 comprises an opening 510 in which the heat exchanger is installed. In this case, the heat exchanger 21 comprises the fins which are covered, on the one hand, by the panel 28 and, on the other hand, by the support wall 22 (along the radial axis of the turbomachine). The heat exchanger 21 also comprises the first profiled wall 25 which is connected upstream to a portion of the radially outer wall 51 and also to the panel 28, and the second wall 26 which is connected downstream to a portion of the radially outer wall 51 and also to the panel 28. The panel 28 is offset radially outwardly from the radially outer wall 51. In this way, the fins 23 are at least partly buried in the wall 51 of the secondary vein, which allows to minimize the disturbance of the flow of the air flow in the secondary vein. Advantageously, the radially outer wall 51, the first wall 25, the panel 28 and the second wall 26 have a continuous surface. The support wall 22 extends radially away from the radially outer wall 51. The wall portion (of the secondary vein with the first wall 25) forms with the support wall 22 an air inlet having a first predetermined height he along the radial axis of the turbomachine which allows to slow down the flow speed of the air flow at the inlet of the heat exchanger. The wall portion (of the secondary vein with the second wall 26) forms with the support wall 22 an air outlet hs having a second predetermined height hs along the radial axis. The ratio between the first height he and the second height hs is between 0.5 and 1.

According to another embodiment in FIG. 13, the radially outer wall 51 comprises a step or recess 53 integrating the heat exchanger. The fins 23 are thus buried at least partly in the wall 51 of the secondary vein, which allows to minimize the disturbance of the flow of the air flow in the secondary vein. The fins extend from the recessed wall 52 and are radially covered by a wall 54 as in the embodiment shown in FIGS. 4 to 6. The recessed wall 53 forms upstream a fillet 55a or a first curved wall that connects the radially outer wall 51 of the secondary vein and downstream a fillet 55b or a second curved wall that connects the radially outer wall 51 of the secondary vein. We consider that the panel 28 and the first and second walls 25, 26 of the preceding embodiments to be formed by the recessed wall 53, the curved walls 55a, 55b, and the wall portions 51a, 51b of the secondary (substantially cylindrical) vein. The support wall 22 is formed by the plate 54. The plate 54 extends into the secondary vein. This has a circular or curved (around the longitudinal axis) shape. The wall portion (of the secondary vein) forms, with the wall 54, an air inlet having a first predetermined height he along the radial axis of the turbomachine, which allows to slow down the flow velocity of the air flow at the inlet of the heat exchanger. The wall portion (of the secondary vein) forms with the wall 54 an air outlet hs having a second predetermined height hs along the radial axis. The ratio between the first height he and the second height hs is between 0.5 and 1. Of course, the panel 28 may be formed by the plate 54 and the support wall by the recess 53.

Figure 15:
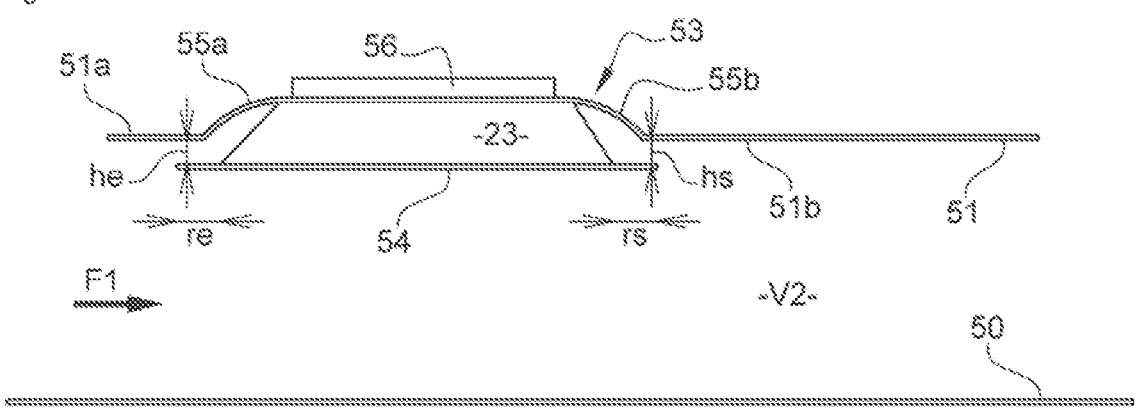
FIG. 15 is another schematic view in axial section of another embodiment of a heat exchanger buried in a wall of the turbomachine according to the invention.

In the examples of FIGS. 14 and 15, an oil duct 56 is arranged in the recessed wall 53 (or in the panel 28). A part of the air flow F2 entering the secondary vein enters the heat exchanger through the air inlet and passes through the fins 23 before exiting the heat exchanger through the air outlet and being accelerated. Another part F1 of the air flow flows outside the heat exchanger and along an outer surface of the wall 22, 54. The air flow that circulates outside does not encounter any obstacles.

Figure 16:
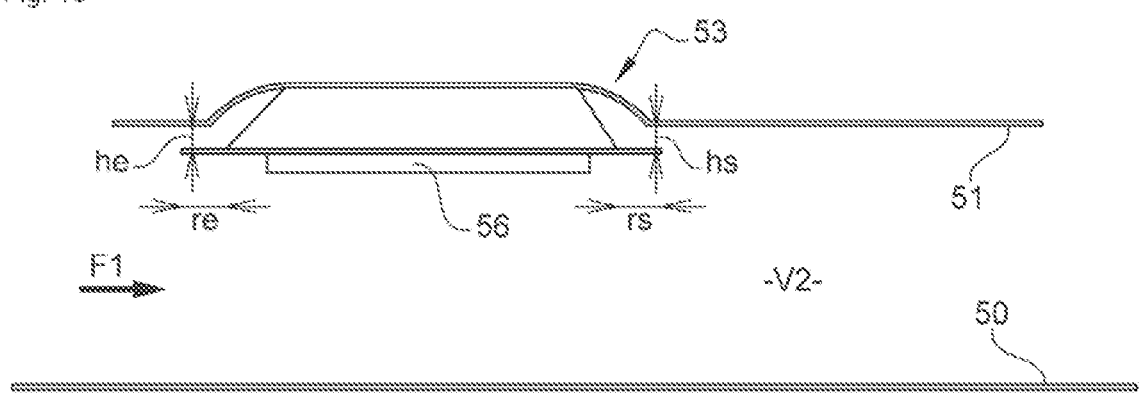
FIG. 16 is a schematic view in axial section of another embodiment of a heat exchanger buried in a wall of the turbomachine according to the invention.

The embodiment shown in FIG. 16 differs from the previous embodiments of FIGS. 14 and 15 in that the oil duct 56 is arranged in the wall 28, 54 which extends into the secondary vein. The air flow circulates on both sides of the oil duct 56 (i.e., inside the heat exchanger and outside the heat exchanger), thereby allowing to improve the heat exchange between the oil and the air.

Figure 17:
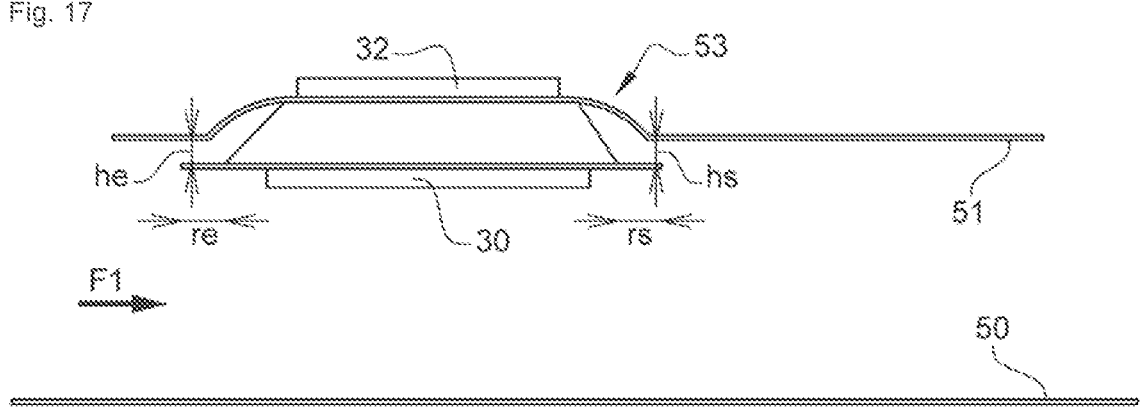
FIG. 17 is a schematic and axial cross-sectional view of another embodiment of a heat exchanger buried in a wall of the turbomachine according to the invention.

In FIG. 17, the embodiment shown differs from the embodiments of FIGS. 12 to 14 in that a first oil duct 30 is arranged in the wall 22, 54 extending into the secondary vein and a second oil duct 32 is arranged in the portion of the radially outer wall which carries the fins. The oil circulating in the first duct 30 exchanges on one side with the air flow passing through the fins 23 and on the other side with the air flow bypassing the fins 23 (which circulates outside the heat exchanger and into the secondary vein V2).

The buried heat exchanger of FIGS. 14 to 17 may also comprise a cover 40 with an aerodynamic profile.

The invention claimed is:

1. A heat exchange system of a turbomachine, the heat exchange system comprising: a heat exchanger comprising a support wall, a plurality of fins each extending in a radial direction from a radially outer surface of the support wall and configured to be swept by an air flow, and a cover covering the fins, wherein the cover is connected upstream, in a direction of flow of the air flow, to a first profiled wall and downstream to a second profiled wall, wherein the first profiled wall is arranged upstream from the plurality of fins and configured so as to guide and slow down the air flow entering the heat exchanger through the plurality of fins, the first profiled wall comprising a first wall portion forming, with the support wall, an air inlet having a first radial height, said first height being less than a radial height of the fins wherein the second profiled wall is arranged downstream of the plurality of fins and configured to accelerate the air flow exiting the heat exchanger, wherein the cover has an at least partly curvilinear aerodynamic profile and an outer peripheral surface having surface continuity with radially outer surfaces of the first and second walls.

2. The heat exchange system according to claim 1, wherein each of the first and second profiled wall is attached to the support wall via support elements extending radially from the radially outer surface.

3. The heat exchange system according to claim 1, wherein the the second profiled wall comprises a first wall portion forming, with the support wall, an air outlet having a second radial height, wherein a ratio between the first radial height and the second height is between 0.5 and 1.0, inclusive.

4. The heat exchange system according to claim 1, wherein the cover comprises a first wall portion defined in an inclined plane forming a predetermined angle with a plane in which the radially outer surface is defined and a second wall portion which is curvilinear and arranged upstream of the first portion.

5. The heat exchange system according to claim 1, wherein the plurality of fins are continuous and rectilinear each along a longitudinal direction, or discontinuous and staggered, or are corrugated.

6. The heat exchange system according to claim 1, wherein the heat exchanger comprises a profiled panel covering the plurality of fins, wherein the profiled panel is substantially flat and extends radially between the plurality of fins and the cover.

7. The heat exchange system according to claim 5, wherein the profiled panel extends to a maximum radial distance from the radially outer surface which is greater than the first height and the second height respectively of the first and second profiled walls.

8. The heat exchange system according to claim 7, further comprising a fluid circulation circuit in which a fluid configured to at least one of cool or lubricate members and/or equipment of the turbomachine circulates, wherein the fluid circulation circuit includes a first duct arranged in the support wall and a second duct arranged in the panel.

9. The heat exchange system according to claim 8, wherein the fluid circulation circuit comprises two channels connecting the first and second ducts to each other.

10. The heat exchange system according to claim 1, wherein at least one fin has a different height along the radial direction and which varies so as to conform to a profile of the cover.

11. The heat exchange system according to claim 1, wherein the plurality of fins comprises a first type of fins and a second type of fins arranged on the radially outer surface along a transverse direction perpendicular to the radial direction, the fins of the first type of fins each extending radially between the support wall and the cover, and each being attached to the cover so as to bear the cover over their full radial heights.

12. The heat exchange system according to claim 11, wherein the plurality of fins is arranged transversely so that every third fin is a fin of the first type.

13. The heat exchange system according to claim 1, wherein the heat exchanger is an additively manufactured heat exchanger.

14. A module of a turbomachine with a longitudinal axis, comprising: an annular casing around the longitudinal axis in which an air flow circulates and a heat exchange system according to claim 6, wherein the heat exchange system is arranged in the annular casing, wherein the annular casing comprises an annular wall which guides at least partly the air flow and which has an opening or a recess in which the heat exchanger with the profiled panel is installed, the first wall being connected upstream of the panel to a portion of the annular wall and the second wall being connected downstream of the panel, to a portion of the annular wall.

15. A turbomachine comprising at least one heat exchange system according to claim 1.

16. A turbomachine comprising at least one turbomachine module according to claim 14.

17. The heat exchange system according to claim 1, wherein the heat exchanger is of the air/fluid type and preferably is a surface heat exchanger.

18. The heat exchange system according to claim 1, wherein the cover and the first and second profiled walls are made in one piece.

19. The heat exchange system according to claim 6, wherein the panel and the first and second profiled walls are made in one piece.

20. The heat exchange system according to claim 6, wherein the cover and the panel are made in one piece.

21. The heat exchange system according to claim 11, wherein the fins of the first type have a central portion with a radial height less than or equal to the height of the cover.

* * * * *